US006088738A

United States Patent [19]
Okada

[11] Patent Number: 6,088,738
[45] Date of Patent: *Jul. 11, 2000

[54] COMMUNICATION CONTROL METHOD AND APPARATUS TO CONNECT A TERMINAL TO A HOST COMPUTER STORING A DESIRED PROGRAM

[75] Inventor: Hideaki Okada, Maebashi, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/759,883

[22] Filed: Dec. 3, 1996

[30] Foreign Application Priority Data

Jul. 2, 1996 [JP] Japan .................................. 8-172622

[51] Int. Cl.[7] .............................. G06F 13/00; G06F 15/16
[52] U.S. Cl. .......................... 709/245; 709/200; 709/212; 709/217; 709/218; 709/227; 709/228; 709/240; 709/245; 709/249; 709/250; 370/392; 370/393; 370/400; 370/401; 370/402; 707/200; 707/203
[58] Field of Search ........................... 395/200.12, 200.7, 395/200.3, 200.32, 200.52, 200.49, 200.75, 200.8, 200.57, 200.67, 200.47, 200.48, 200.79, 200.58; 711/100; 707/200, 203; 379/88.18; 709/228, 245, 240, 200, 202, 212, 217, 227, 218, 219, 250, 222; 370/400, 401, 402, 392, 393

[56] References Cited

U.S. PATENT DOCUMENTS

| | | | |
|---|---|---|---|
| 4,677,588 | 6/1987 | Benjamin et al. ........................ | 709/228 |
| 4,837,805 | 6/1989 | Okumura .............................. | 379/90.01 |
| 5,077,655 | 12/1991 | Jinzaki ................................. | 395/200.67 |
| 5,396,485 | 3/1995 | Ohno et al. ............................ | 370/217 |
| 5,424,724 | 6/1995 | Williams et al. ................... | 340/825.05 |
| 5,440,558 | 8/1995 | Ban ......................................... | 370/463 |
| 5,493,607 | 2/1996 | Arumainayagam et al. ........ | 379/88.18 |
| 5,528,671 | 6/1996 | Ryu et al. ............................. | 379/93.14 |
| 5,548,729 | 8/1996 | Akiyoshi et al. ................... | 395/200.52 |
| 5,568,180 | 10/1996 | Okamoto ..................................... | 348/7 |
| 5,572,724 | 11/1996 | Watanabe et al. ....................... | 707/200 |
| 5,583,862 | 12/1996 | Callon ..................................... | 370/397 |
| 5,655,073 | 8/1997 | Nishikado et al. ................. | 395/183.14 |
| 5,748,894 | 5/1998 | Ishizaki et al. ................................. | 1/1 |
| 5,805,816 | 9/1998 | Picazo, Jr. et al. ...................... | 709/249 |
| 5,815,664 | 9/1998 | Asano ................................. | 395/200.57 |

*Primary Examiner*—Mehmet B. Geckil
*Assistant Examiner*—William C. Vaughn, Jr.
*Attorney, Agent, or Firm*—Staas & Halsey LLP

[57] ABSTRACT

A method and apparatus for controlling a communication between plural host computers connected to terminal apparatus. The communication controlling apparatus includes a storage unit for storing information relating to upper apparatus names, information relating to program names and information relating to pseudo program names. The communication controlling apparatus also includes a control unit for receiving information relating to a pseudo program name transmitted from a lower apparatus, obtaining from the information stored in the storage unit information relating to an upper apparatus name corresponding to the information relating to the pseudo program name, converting the information relating to the pseudo program name into information relating to a corresponding program name on the basis of the information stored in the storage unit, and transmitting the information relating to the converted program name to an upper apparatus corresponding to the information relating to the obtained upper apparatus name, thereby controlling a communication between the upper apparatus and the lower apparatus. Even if plural host computers store programs having identical names, the terminal apparatus can be connected to a desired host computer, whereby a service to the users may be improved.

8 Claims, 9 Drawing Sheets

| LU NAME | HOST PROGRAM NAME |
|---------|-------------------|
| LUA | AAA |
| LUB | BBB |
| LUC | CCC |

112A

Q — (left side of table)  P — (right side of table)

FIG.9
PRIOR ART

|   | LU NAME | HOST PROGRAM NAME |   |
|---|---------|-------------------|---|
| T— | LUA | ABC | —R |
| U— | LUB | ABC | —S |
|   | LUC | ABC |   |

112B

COMMUNICATION CONTROL METHOD AND APPARATUS TO CONNECT A TERMINAL TO A HOST COMPUTER STORING A DESIRED PROGRAM

BACKGROUND OF THE INVENTION (1) Field of the Invention

The present invention relates to a communication controlling apparatus and a communication controlling method used in the communication controlling apparatus, and a communication system having the communication controlling apparatus suitable for use upon connecting plural host computers to terminal apparatus (clients) connected to each other and controlling communications therebetween.

(2) Description of Related Art

There is a communication system in which plural host computers.(hosts) and terminal apparatus (terminals) as clients are connected to each other, and which can provide a service such that the terminal can use a program or the like stored in the host.

Figure 5:
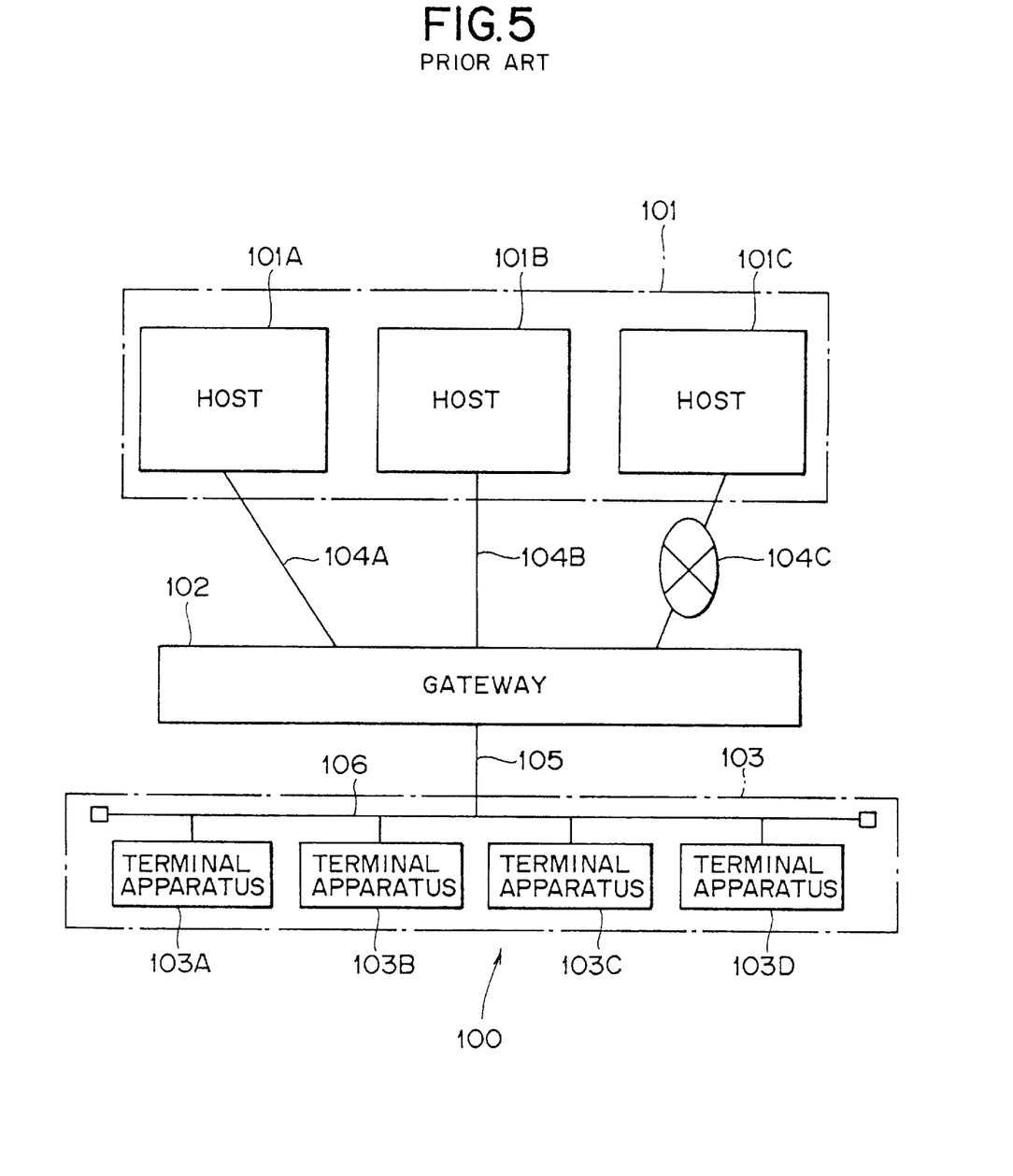
FIG. 5 is a block diagram showing an example of a structure of a communication system in which plural host computers and terminal apparatus are connected to each other.

FIG. 5 is a block diagram showing an example of such a communication system. A communication system 100 shown in FIG. 5 has host computers (hosts) 101A through 101C, a gateway 102 and terminal apparatus (terminals) 103A through 103D.

The hosts 101A through 101C are upper apparatus each of which stores host programs (programs) to provide a service using these programs to the terminals 103A through 103D.

Figure 7:
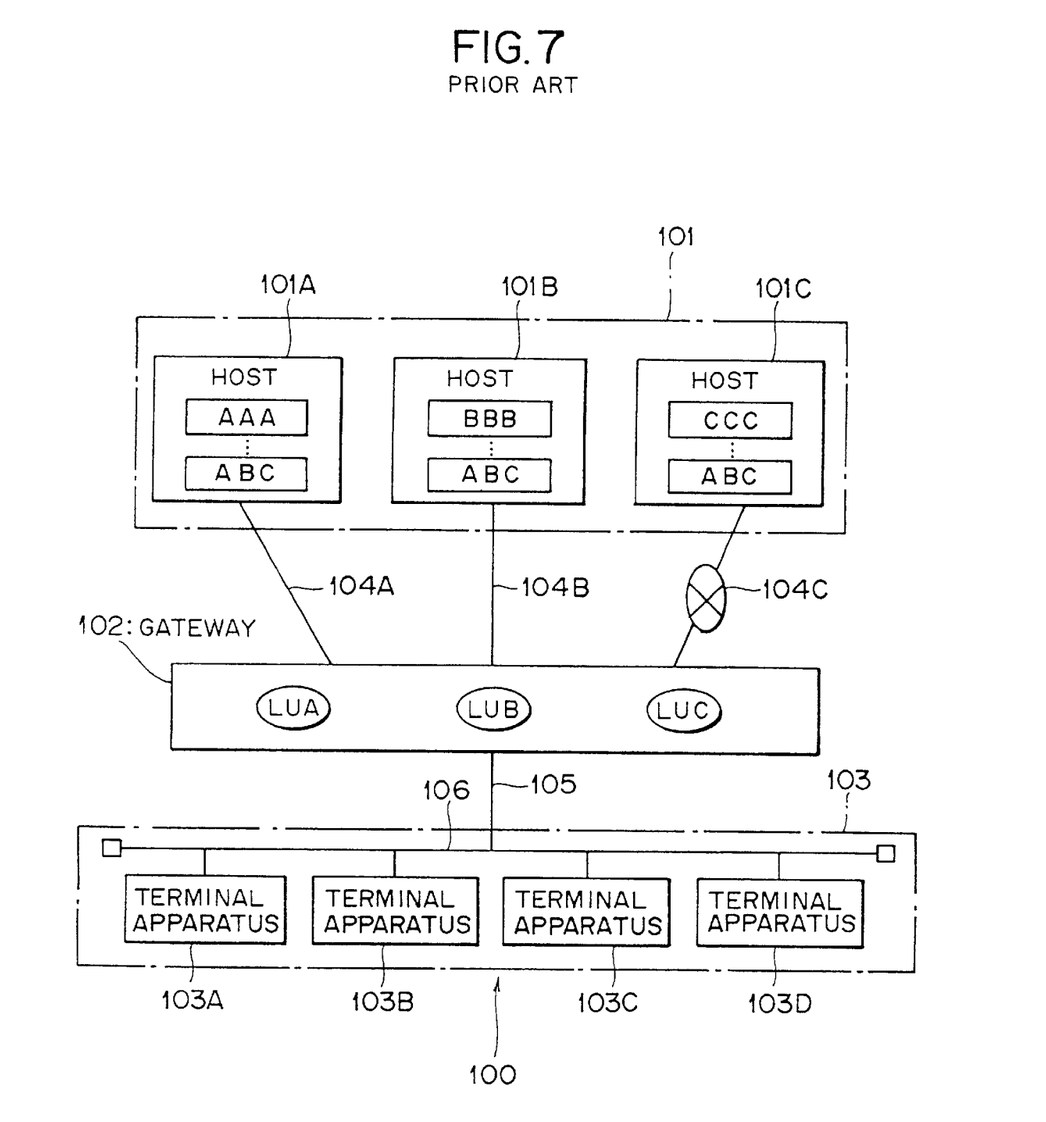
FIG. 7 is a diagram for illustrating an operation of the communication system having the communication controlling apparatus.

For example, the host 101A stores programs having program names "AAA" and "ABC", the host 101B stores programs having program names "BBB" and "ABC", and the host 101C stores programs having program names "CCC" and "ABC", as shown in FIG. 7.

Figure 6:
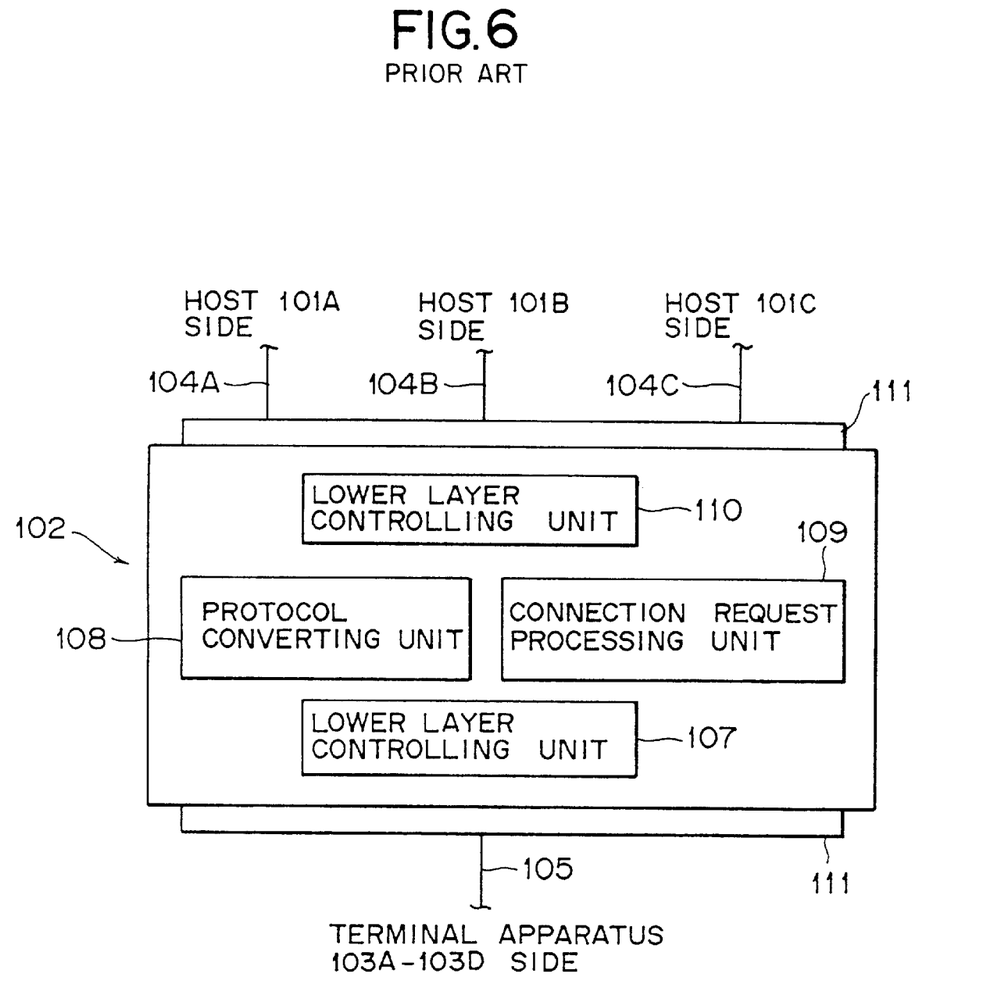
FIG. 6 is a functional block diagram showing a structure of a communication controlling apparatus.

The gateway 102 is a communication controlling apparatus provided between a host group 101 composed of the hosts 101A through 101C and a terminal group 103 composed of the terminals 103A through 103D to control communications therebetween. The gateway 102 functionally has lower layer controlling units 107 and 110, a protocol converting unit 108 and a connection request processing unit 109 as shown in FIG. 6, details of which will be described later.

The hosts 101A and 101B are connected to the gateway 102 via dedicated lines 104A and 104B, respectively, whereas the host 101C is connected to the gateway 102 via a switched line 104C.

Each of the terminals 103A through 103D transmits a connection request command to a desired host 101A, 101B or 101C via the gateway 102 to access to that host 101A, 101B or 101C, thereby being provided a program from that desired host 101A, 101B or 101C.

Namely, each of the terminals 103A through 103D functions as a lower apparatus which gets a service provided from the host 101A, 101B or 101C by conducting a desired process using a program provided from the host 101A, 101B or 101C.

In each of the terminals 103A through 103D, the function mentioned above is realized in a process using a program (software) such as an emulator or the like.

The terminals 103A through 103D are connected to each other by a LAN (Local Area Network) line 106 to form the terminal group 103. The terminal group 103 is connected to the gateway 102 via a dedicated line 105.

The gateway 102 is physically connected to each of the lines (the dedicated lines 104A, 104B and 105, and the switched line 104C) via a board 111 shown in FIG. 6.

Next, the gateway 102 mentioned above will be described in detail.

As having been described hereinbefore, the gateway 102 is functionally configured with the lower layer controlling units 107 and 110, the protocol converting unit 108 and the connection request processing unit 109 as shown in FIG. 6. These functions are realized by a process using a software.

The lower layer controlling unit 107 controls lower layers on the side of the terminals 103A through 103D (each of hierarchies such as a physical layer, a data link layer, a network layer and the like in the network architecture). The lower layer controlling unit 110 controls lower layers on the side of the hosts 101A through 101C.

The protocol converting unit 108 converts a protocol on the side of the terminals 103A through 103D inputted via the lower layer controlling unit 107 into a protocol on the side of the hosts 101A through 101C, besides converting a protocol on the side of the hosts 101A through 101C inputted via the lower layer controlling unit 110 into a protocol on the side of the terminals 103A through 103D. If the protocol of the hosts 101A through 101C is identical to that of the terminals 103A through 103D, the protocol converting unit 108 does not convert the protocol.

The connection request processing unit 109 conducts a process on a connection request command sent from each of the terminals 103A through 103D which has undergone a protocol converting process by the protocol converting unit 108 in an application program level on the basis of contents of tables 112A and 112B shown in FIGS. 8 and 9 held in a storage (not shown), as will be described later.

Figure 8:
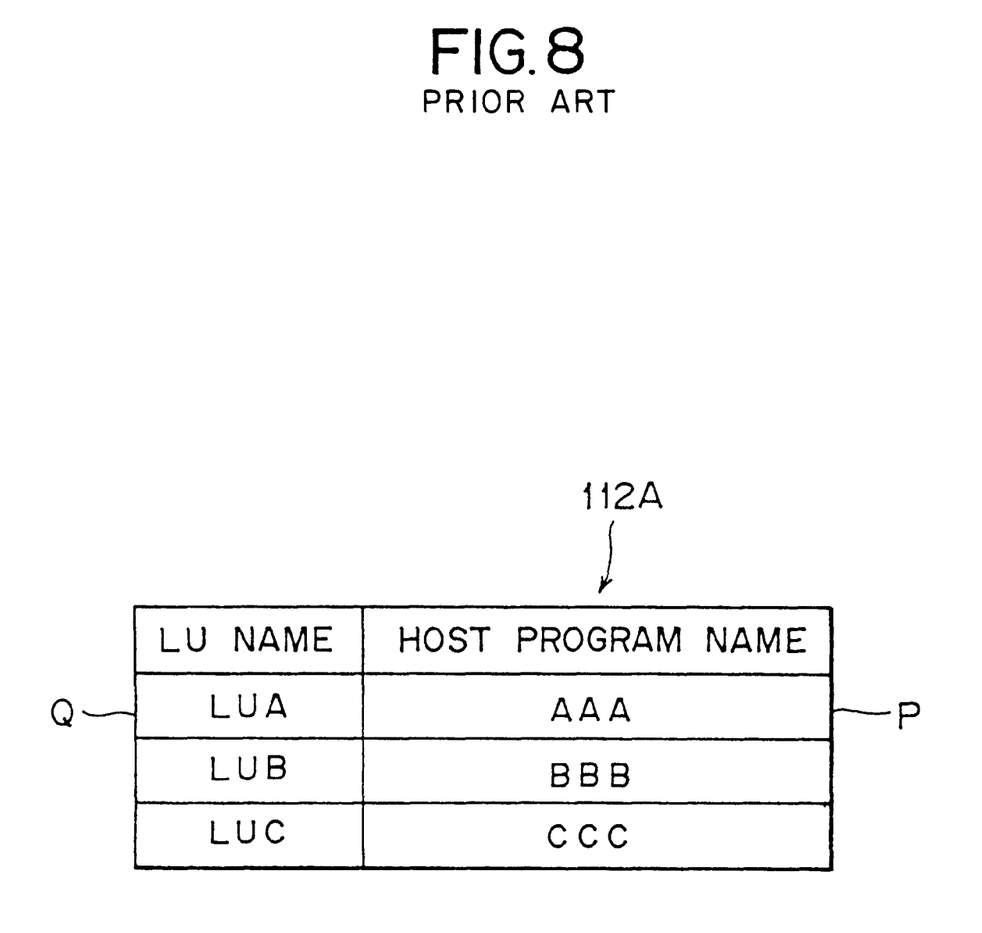
FIG. 8 is a diagram showing an example of a table held by the communication controlling apparatus.
Figure 9:
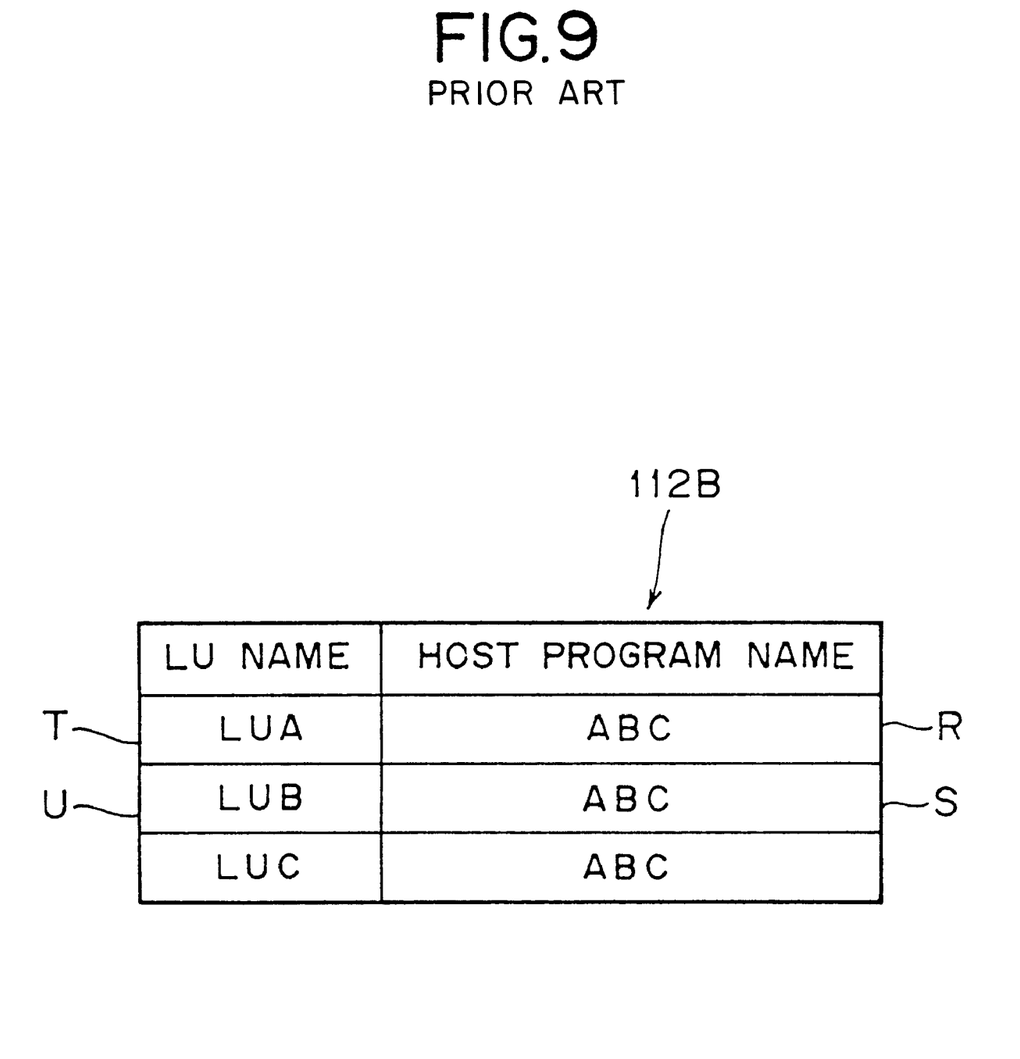
FIG. 9 is a diagram showing another example of the table held by the communication controlling apparatus.

Each of the tables 112A and 112B stores LU (Logical Unit) names which are information relating to names of the hosts 101A through 101C and host program names which are information relating to program names stored in the hosts 101A through 101C in such a manner that the LU names and the host program names correspond to each other, as shown in FIGS. 8 and 9.

With the above structure, the communication system 100 shown in FIG. 5 operates as described below. An operation of the communication system at that time will be now described with reference to FIG. 7.

When connection request demands are transmitted from the terminals 103A through 103D, these connection request demands are inputted to the connection request processing unit 109 of the gateway 102 via the LAN line 106 and the dedicated line 105.

In the connection request command, a host program name of a program that the terminal desires to use is designated. The gateway 102 judges only from the host program name designated in the connection request command a host in which the program is stored.

If the terminal 103A intends to use a program "AAA" stored in the host 101A, for example, a connection request command in which a host program name "AAA" is designated is transmitted from the terminal 103A to the gateway 102.

The connection request processing unit 109 of the gateway 102 takes out the host program name "AAA" from the connection request command transmitted from the terminal 103A, and retrieves the host program name "AAA" from the table 112A shown in FIG. 8.

When the host program name "AAA" (a P portion shown in FIG. 8) is retrieved as above, the connection request processing unit 109 further obtains a corresponding LU name "LUA" (a Q portion shown in FIG. 8) in the table shown in FIG. 8, then transmits the connection request command to the host 101A which is a host corresponding to the LU name "LUA".

If the terminal 103A intends to use a program "ABC" stored in the host 101A, for example, a connection request command in which a host program name "ABC" is designated is transmitted from the terminal 103A to the gateway 102.

The connection request processing unit 109 of the gateway 102 takes out the program name "ABC" from the connection request command transmitted from the terminal 103A, then successively retrieves the host program name "ABC" from a leading address of the table 112B shown in FIG. 9.

At that time, the connection request processing unit 109 retrieves the host program name "ABC" in an R portion shown in FIG. 9 by referring to the table 112B. When the host program name "ABC" is retrieved as above, a corresponding LU name "LUA" (a T portion shown in FIG. 9) is further obtained from the table 112B, then the connection request is transmitted to a host 101A which is a host corresponding to the LU name "LUA".

Incidentally, the programs named "ABC" stored in the hosts 101A through 101C are not necessarily identical to each other even if their host program names are identical. For this, if one of the terminals 103A through 103D intends to use a desired program, it is necessary that the terminal is certainly connected to a host storing that program.

If data under process by, or data desired to be referred by, one of the terminals 103A to 103D is stored in, for example, the host 101B, that terminal 103A to 103D cannot obtain the data unless that terminal 103A to 103D is connected to the host 101B even if the programs stored in the hosts 101A to 101C are identical. It is thus necessary that terminal is certainly connected to the host in which that data is stored.

However, in the above communication system shown in FIG. 5, no host name of a host in which a program that the terminal desires to use is stored is not designated in the connection request command transmitted from the terminal so that the connection request might be transmitted to a host that the terminal does not desire to be connected if plural hosts store programs having identical names.

Accordingly, there is a disadvantage that each of the terminals 103A through 103D might receive a program (having the identical host program name) different from a program that the terminal desires to use through the gateway 102 in the above case.

For instance, if the terminal 103A intends to use a program "ABC" stored in the host 101B, the connection request command is transmitted from the terminal 103A to the gateway 102 similarly to the above case.

The connection request processing unit 109 of the gateway 102 does not retrieve a host program name "ABC" in an S portion shown in FIG. 9 but retrieves a host program name "ABC" in the R portion shown in FIG. 9. As a result, a corresponding LU name "LUA" (an S portion shown in FIG. 9) is obtained. Accordingly, the connection request command is transmitted to the host 101A which is a host corresponding to the LU name "LUA".

In the above communication system shown in FIG. 5, the gateway 102 cannot transmit the connection request command to the host 101B when the terminal 103A intends to use the program "ABC" stored in the host 101B.

SUMMARY OF THE INVENTION

In the light of the above problem, an object of the present invention is to provide a simply structured communication controlling apparatus and a communication controlling method used in the communication controlling apparatus by which a terminal apparatus can be connected to a host computer storing a desired program even if plural host computers store programs having identical names, whereby a service to users may be improved. Another object of the present invention is to provide a communication system having the above communication controlling apparatus.

The present invention therefore provides a communication controlling apparatus for connecting plural upper apparatus each storing a program to lower apparatus each conducting a desired process using the program stored in the upper apparatus to control communications therebetween comprising a storage unit for storing information relating to upper apparatus names, information relating to program names, and information relating to pseudo program names showing correspondence between the programs and the upper apparatus in which the programs are stored in such a manner that the information relating to upper apparatus names, the information relating to program names and the information relating to pseudo program names are corresponded to each other, and a control unit for receiving information relating to the pseudo program name transmitted from the lower apparatus, obtaining information relating to the upper apparatus names corresponding to the information relating to the pseudo program name from the information stored in the storage unit, converting the information relating to the pseudo program name into information relating to the program name on the basis of the information stored in the storage unit and transmitting the information relating to the converted program name to the upper apparatus corresponding to the information relating to the obtained upper apparatus name, thereby controlling a communication between the upper apparatus and the lower apparatus.

In the communication controlling apparatus according to the present invention, the storage unit has a table in which information relating to the upper apparatus names, information relating to the program names and information relating to the pseudo program names are stored in such a manner that the information relating to the upper apparatus names, the information relating to the program names and the information relating to the pseudo program names are corresponded to each other.

In the communication controlling apparatus according to the present invention, the control unit comprises a connection request receiving unit for receiving a connection request command including information relating to the pseudo program name transmitted from the lower apparatus, a pseudo program name information retrieving unit for taking out the information relating to the pseudo program name from the connection request command received by the connection request receiving unit to retrieve from the information stored in the storage unit the information relating to the pseudo program name taken out from the connection request command, an upper apparatus name information obtaining unit for obtaining information relating to the upper apparatus name corresponding to the information relating to the pseudo program name retrieved from the information stored in the storage unit by the pseudo program name information retrieving unit, a program name information converting unit for converting the pseudo program name information included in the connection request command into information relating to the program name corresponding to the information relating to the pseudo program name retrieved by the pseudo program name information retrieving unit on the basis of the information stored in the storage unit, and a connection request transmitting unit for transmitting the connection request command including the information relating to the program name converted by the program name information converting unit to the upper apparatus corresponding to the information relating to the upper apparatus name obtained by the upper apparatus name obtaining unit.

The communication controlling apparatus according to this invention can control communications between the above upper apparatus and lower apparatus. Even if the plural upper apparatus store programs having identical names, the lower apparatus can be certainly connected to an upper apparatus storing a desired program while the lower apparatus is unconscious of a host name. It is therefore possible to improve a service to the users.

The storage unit holds a table in which information relating to upper apparatus names, information relating to program names and information relating to pseudo program names are stored in such a manner that the information relating to upper apparatus names, the information relating to program names and the information relating to pseudo program names are corresponded to each other, whereby a process in the control unit can be simplified.

The present invention further provides a communication controlling method used in a communication controlling apparatus for connecting plural upper apparatus each storing a program to lower apparatus each conducting a desired process using the program stored in the upper apparatus to control communications therebetween comprising the steps of providing a storage unit for storing information relating to upper apparatus names, information relating to program names and information relating to pseudo program names showing correspondence between the programs and the upper apparatus in which the programs are stored in such a manner that the information relating to upper apparatus names, the information relating to program names and the information relating to pseudo program names are corresponded to each other, receiving information relating to the pseudo program name transmitted from the lower apparatus, obtaining from the information stored in the storage unit information relating to the upper apparatus name corresponding to the information relating to the pseudo program name, converting the information relating to the pseudo program name into information relating to the program name corresponding thereto on the basis of the information stored in the storage unit and transmitting the information relating to the converted program name to the upper apparatus corresponding to the information relating to the obtained upper apparatus name, thereby controlling a communication between the upper apparatus and the lower apparatus.

The communication controlling method used in the communication controlling apparatus according to this invention can control communications between the above upper apparatus and lower apparatus. Even if the plural upper apparatus store programs having identical names, the lower apparatus can be certainly connected to an upper apparatus storing a desired program while the lower apparatus is unconscious of a host name. It is therefore possible to improve a service to the users.

The present invention still further provides a communication system comprising plural upper apparatus each storing a program, lower apparatus each conducting a desired process using the program stored in the upper apparatus and a communication controlling apparatus for connecting the upper apparatus to the lower apparatus to control communications therebetween, wherein the communication controlling apparatus including a storage unit for storing information relating to upper apparatus names, information relating to program names and information relating to pseudo program names showing correspondence between the programs and the upper apparatus in which the programs are stored in such a manner that the information relating to upper apparatus names, the information relating to program names and the information relating to pseudo program names are corresponded to each other, and a control unit for receiving information relating to the pseudo program name transmitted from the lower apparatus) obtaining from the information stored in the storage unit information relating to the upper apparatus name corresponding to the information relating to the pseudo program name, converting the information relating to the pseudo program name into information relating to the program name corresponding thereto on the basis of the information stored in the storage unit and transmitting the information relating to the converted program name to the upper apparatus corresponding to the information relating to the obtained upper apparatus name, thereby controlling a communication between the upper apparatus and the lower apparatus.

In the communication system having the communication controlling apparatus according to the present invention, the upper apparatus may be a host computer, the lower apparatus may be a terminal apparatus and the communication apparatus may be a gateway.

The communication system having the communication controlling apparatus according to this invention can control communications between the above upper apparatus and lower apparatus. Even if the plural upper apparatus store programs having identical names, the lower apparatus can be certainly connected to an upper apparatus storing a desired program while the lower apparatus is unconscious of a host name. It is therefore possible to improve a service to the users.

DESCRIPTION OF THE PREFERRED EMBODIMENTS

Now, description will be made of embodiments of this invention referring to the drawings.

Figure 1:
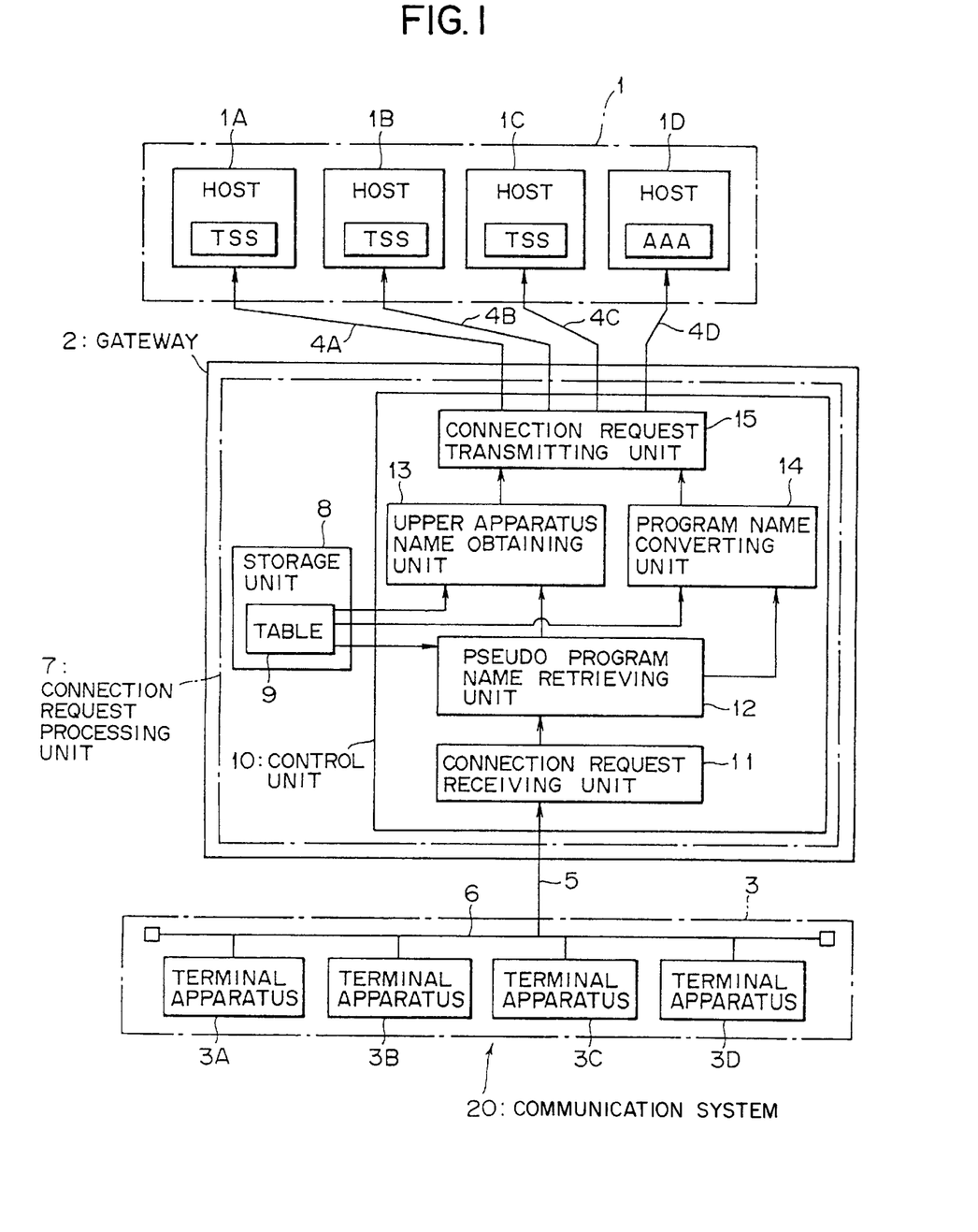
FIG. 1 is a functional block diagram showing a structure of a communication system having a communication controlling apparatus according to an embodiment of this invention.

FIG. 1 is a functional block diagram showing a structure of a communication system having a communication controlling apparatus according to an embodiment of this invention.

A communication system 20 shown in FIG. 1 has plural host computers (hosts) 1A through 1D and terminal apparatus (terminals) 3A through 3D as clients connected to each other to provide a service such that each of the terminals 3A through 3D can use programs or the like stored in the hosts 1A through 1D, for example.

The hosts 1A through 1D are upper apparatus each of which stores a host program (a program) to provide a service using the program to the terminals 3A through 3D. Each of the hosts 1A through 1C shown in FIG. 1 stores a program having a program name (a host program name) "TSS", whereas the host 1D stores a program having a host program name "AAA".

A gateway 2 is a communication controlling apparatus which is provided between a host group 1 comprised of the hosts 1A through 1D and a terminal group 3 comprised of the terminals 3A through 3D to control communications therebetween. The gateway 2 functionally has a lower layer controlling unit on the side of the terminals 3A through 3D, a lower layer controlling unit on the side of the hosts 1A through 1D, a protocol converting unit and a connection request processing unit (FIG. 1 shows only the-connection request processing unit by a reference numeral 7), similarly to the gateway 102 shown in FIG. 6, detailed descriptions of which will be made later.

The hosts 1A through 1D are connected to the gateway 2 via dedicated lines 4A through 4D, respectively.

Further, each of the terminals 3A through 3D transmits a connection request command to the desired host 1A, 1B, 1C or 1D via the gateway 2 to access to that desired host 1A, 1B, 1C or 1D so as to be provided a program from that desired host 1A, 1B, 1C or 1D.

Namely, each of the terminals 3A through 3D functions as a lower apparatus which receives a service provided by the host 1A, 1B, 1C or 1D by conducting a desired process using a program provided by that host 1A, 1B, 1C or 1D.

The above function is realized by a process using a software such as an emulator or the like in these terminals 3A through 3D.

Incidentally, the terminals 3A through 3D are connected by a LAN (Local Area Network) line 6 to form the terminal group 3. The terminal group 3 is connected to the gateway 2 via a dedicated line 5.

The communication system 20 according to this embodiment will be described by way of an example in which a communication protocol of the hosts 1A through 1D is SNA (Systems Network Architecture), while a communication protocol of the terminals 3A through 3D is FNA (Fujitsu Network Architecture). However, it is alternatively possible that the hosts 1A through 1D and the terminals 3A through 3D use communication protocols other than the above protocols.

Now, the above gateway 2 will be described in detail.

The gateway 2 functionally has, similarly to the gateway 102 mentioned above shown in FIG. 6, a lower layer controlling unit on the side of the terminals 3A through 3D (refer to reference numeral 107 in FIG. 6), a lower layer controlling unit on the side of the hosts 1A through 1D (refer to reference numeral 110), a protocol converting unit (refer to reference numeral 108) and a connection request processing unit 7 (refer to reference numeral 109).

The lower layer controlling unit on the side of the terminals 3A through 3D, the lower layer controlling unit on the side of the hosts 1A through 1D and the protocol converting unit have structures and functions similar to those having been described hereinbefore with reference to FIG. 6, respectively.

The connection request processing unit 7 has a storage unit 8 and a control unit 10 as shown in FIG. 1 to conduct a process on a connection request command transmitted from each of the terminals 3A through 3D in an application program level after the protocol conversion (i.e., after the protocol FNA of the terminals 3A through 3D has been converted into the protocol SNA of the hosts 1A through 1D) by the protocol converting unit. If the protocol of the hosts 1A through 1D is identical to the protocol of the terminals 3A through 3D, the protocol converting unit does not convert the protocol, but conducts a process on the connection request command transmitted from the terminal 3A, 3B, 3C or 3D.

Figure 2:
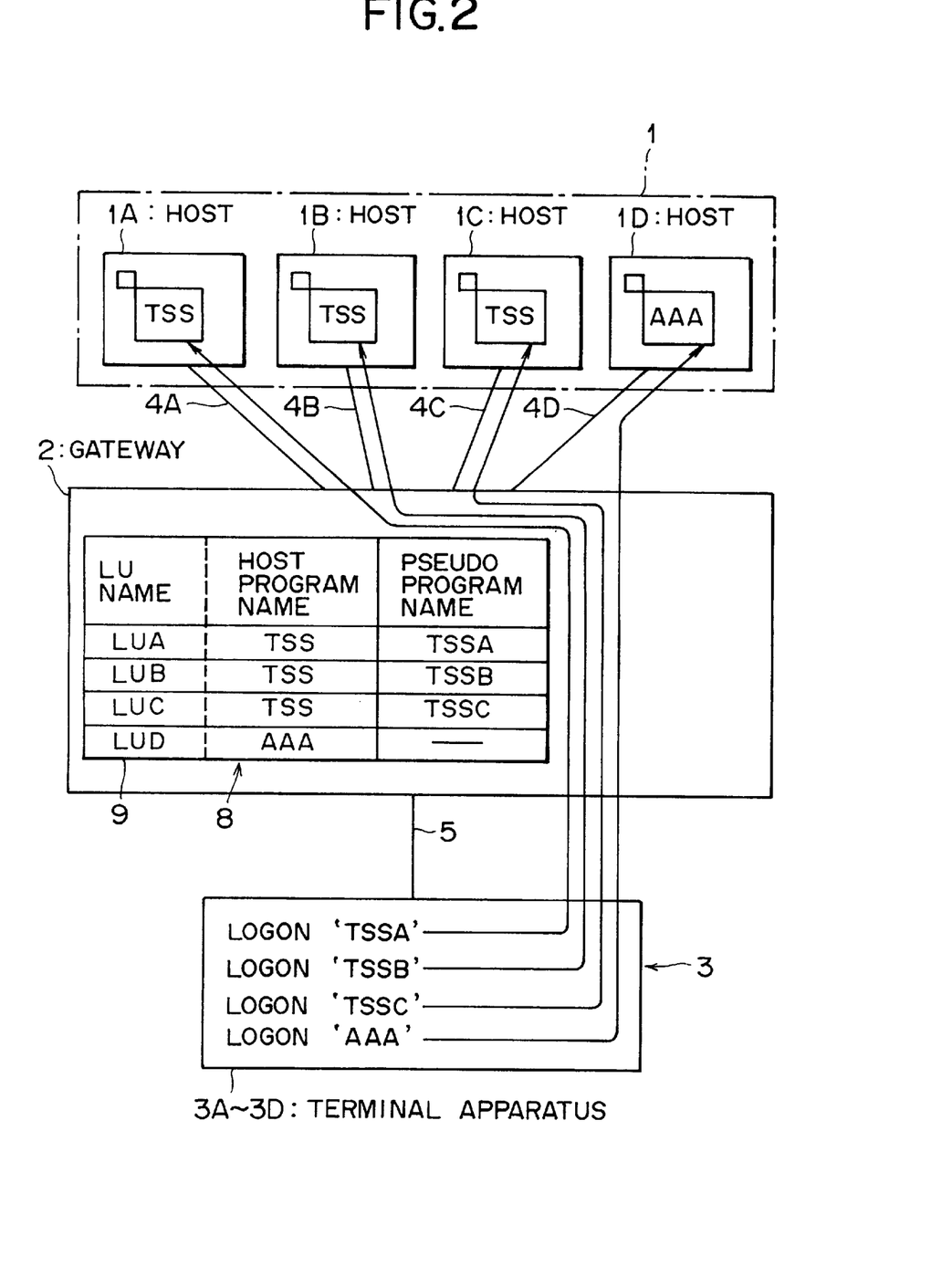
FIG. 2 is a diagram for illustrating an operation of the communication system having the communication controlling apparatus according to the embodiment of this invention.

The storage unit 8 is configured with a memory or the like, and has a table 9 as shown in FIG. 2, for example. The table 9 stores LU (Logical Unit) names which are information relating to the names of the hosts 1A through 1D, host program names which are information relating to program names stored in the hosts 1A through 1D, and pseudo program names which are information showing the correspondence between the host program names and the hosts 1A through 1D storing the programs in such a manner that the LU names, the host program names and the pseudo program names are corresponded to each other.

Namely, the pseudo program name is used to specify a program stored in each of the hosts if plural hosts store programs having identical names.

For instance, a pseudo program name "TSSA" specifies a program stored in the host 1A among programs having a host program name "TSS" stored in the hosts 1A through 1C.

A program having a host program name "AAA" exists only in the host 1D so that there exists no pseudo program name corresponding to the program "AAA" as shown in FIG. 2.

In the communication system 20 according to this embodiment, a connection request command including the above pseudo program name and a connection request command including a host program name are used as the connection request commands transmitted from the terminals 3A through 3D, whereby each of the terminals 3A through 3D can be certainly connected to not only the hosts 1A, 1B or 1C storing a desired program even if the plural hosts 1A through 1C store programs (the program "TSS" in FIG. 1) having the identical names but also the host 1D storing a program (the program "AAA" in FIG. 1) having no pseudo program name.

Figure 3:
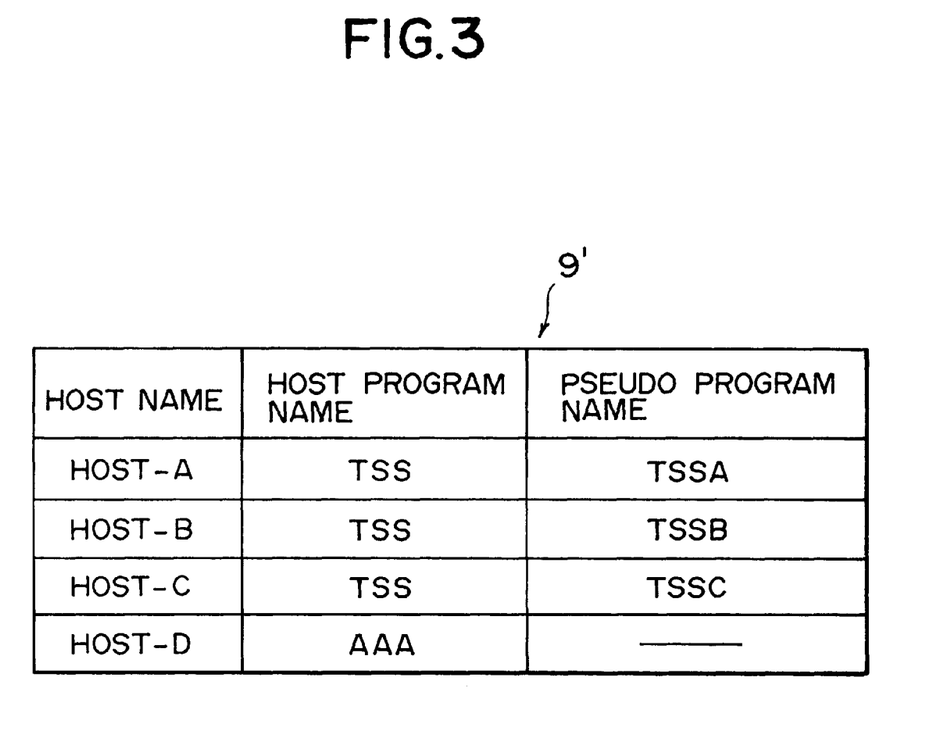
FIG. 3 is a diagram showing another example of a table held by the communication controlling apparatus according to the embodiment of this invention.

It is alternatively possible to use a table 9' as shown in FIG. 3 storing host names which are information relating to names of the hosts 1A through 1D, host program names and pseudo program names in such a manner that the host names, the host program names and the pseudo program names are corresponded to each other instead of the table 9.

The control unit 10 receives a connection request command including a pseudo program name transmitted from the terminal 3A, 3B, 3C or 3D, obtains an LU name corresponding to the pseudo program name from information stored in the table 9, converts the pseudo program name into a host program name corresponding thereto on the basis of the information stored in the table 9, and transmits the connection request command including the converted host program name to the host 1A, 1B, 1C or 1D corresponding to the obtained LU name, thereby controlling a communication between the above host 1A, 1B, 1C or 1D and the terminals 3A, 3B, 3C or 3D.

The control unit 10 functionally has, as shown in FIG. 1, a connection request receiving unit 11, a pseudo program name retrieving unit (the pseudo program name information retrieving unit) 12, an upper apparatus name obtaining unit (the upper apparatus name information obtaining unit) 13, a program name converting unit (the program name information converting unit) 14 and a connection request transmitting unit 15 in order to realize the above functions. These functions are realized by a process using a software.

Now, these function will be described in detail with reference to FIG. 2. The connection request receiving unit 11 receives a connection request command including a pseudo program name transmitted from each of the terminals 3A through 3D. If any one of the terminals 3A through 3D desires to use a program "TSS" stored in the host 1A, for example, a connection request command LOGON 'TSSA' including a pseudo program name "TSSA" is transmitted as shown in FIG. 2. The connection request receiving unit 11 receives this connection request command.

The pseudo program name retrieving unit 12 takes out the pseudo program name from the connection request command received by the connection request receiving unit 11, and retrieves the pseudo program name taken out from the connection request command in information stored in the table 9. When the connection request command LOGON 'TSSA' is received by the connection request receiving unit 11, for example, the pseudo program name retrieving unit 12 takes out the pseudo program name "TSSA" from the connection request command, and retrieves the pseudo program name "TSSA" in the table 9.

The upper apparatus name obtaining unit 13 obtains an LU name corresponding to the pseudo program name retrieved by the pseudo program name retrieving unit 12 in the information stored in the table 9. If a pseudo program name retrieved by the pseudo program name retrieving unit 12 is "TSSA", for example, the upper apparatus name obtaining unit 13 obtains an LU name "LUA" corresponding to the pseudo program name "TSSA" from the table 9.

The program name converting unit 14 converts the pseudo program name included in the connection request command into a host program name corresponding to the pseudo program name retrieved by the pseudo program name retrieving unit 12 on the basis of the information stored in the table 9. If a pseudo program name retrieved by the pseudo program name retrieving name 12 is "TSSA", the program name converting unit 14 converts the pseudo program name "TSSA" into a host program name "TSS" corresponding thereto on the basis of the table 9.

The connection request transmitting unit 15 transmits the connection request command including the host program name converted by the program name converting unit 14 to the host 1A, 1B, 1C or 1D corresponding to the LU name obtained by the upper apparatus name obtaining unit 13. If a connection request command received by the connection request receiving unit is LOGON 'TSSA', for example, an LU name obtained by the upper apparatus name obtaining unit 13 is "LUA" and a host program name converted by the program name converting unit 14 is "TSS" so that the connection request command (i.e., LOGON 'TSS') including the host program name "TSS" is transmitted to the host 1A corresponding to the LU name "LUA".

Namely, the gateway 2 according to this embodiment has a function to hold the table 9 in which host names, host program names and pseudo program names are corresponded to each other to distribute a connection request command transmitted from each of the terminals 3A through 3D to a predetermined host 1A, 1B, 1C or 1D on the basis of the table 9.

If a host program name converted by the program name converting unit 14 is reflected on a connection request command transmitted from the terminal 3A, 3B, 3C or 3D in the connection request transmitting unit 15, it is possible to couple the connection request command from which a pseudo program name has been taken out by the pseudo program name retrieving unit 12 to the host program name converted by the program name converting unit 14. It is alternatively possible to directly convert a connection request command including a pseudo program name transmitted from the terminal 3A, 3B, 3C or 3D into the connection request command including a host program name.

In the communication system 20 having the communication controlling apparatus with the above structure according to this embodiment, the connection request processing unit 7 of the gateway 2 conducts a process on a connection request command when the connection request command including a pseudo program name is transmitted from the terminal 3A, 3B, 3C or 3D and transmits the processed connection request command to a predetermined host 1A, 1B, 1C or 1D.

An operation of the connection request processing unit 7 of the gateway 2 at that time will be further described with reference to a flowchart shown in FIG. 4.

When a connection request command is transmitted from the terminal 3A, 3B, 3C or 3D while the gateway 2 is in a standby state (an event waiting state), the connection request receiving unit 11 in the connection request processing unit 7 of the gateway 2 receives the transmitted connection request command (Step A1).

When the connection request is received, the pseudo program name retrieving unit 12 takes out a designated program name (a pseudo program name or a host program name) from the connection request command (Step A2).

The pseudo program name retrieving unit 12 then retrieves all pseudo program names stored in the table 9 (Step A3), and judges whether the designated program name taken out coincides with any one of the pseudo program names stored in the table (Step A4).

If the designated program name taken out coincides with any one of the pseudo program names stored in the table 9 (i.e., if the designated program name taken out is a pseudo program name and this pseudo program name coincides with any one of the pseudo program names stored in the table 9), the upper apparatus name obtaining unit 13 obtains an LU name corresponding to the retrieved pseudo program name from the table 9 (from YES route at Step A4 to Step A1).

Then, program name converting unit 14 converts the pseudo program name which is the designated program name taken out into a corresponding host program name (Step A6).

The connection request transmitting unit 15 transmits the connection request command including the host program name converted by the program name converting unit 14 to the host 1A, 1B, 1C or 1D corresponding to the LU name obtained by the upper apparatus name obtaining unit 13 (Step A7).

If the designated program name taken out does not coincides with any pseudo program name stored in the table 9 (i.e., if the designated program name taken out is a host program name or the designated program name taken out is not stored in the table 9 although it is a pseudo program name), the pseudo program name retrieving unit 12 retrieves all host program names stored in the table 9 (from NO route at Step A4 to Step A8), then judges whether the designated program name taken out coincides with any one of the host program names stored in the table 9 (step A9).

If the designated program name taken out coincides with any one of the host program names stored in the table 9 (i.e., if the designated program name taken out is a host program name and this host program name coincides with any one of host program names stored in the table 9), the upper apparatus name obtaining unit 13 obtains an LU name corresponding to the retrieved host program name from the table 9 (from YES route at Step A9 to Step A10).

Receiving the UL name, the connection request transmitting unit 15 transmits the connection request command including the host program name received by the connection request receiving unit 11 to the host 1A, 1B, 1C or 1D corresponding to the LU name obtained by the upper apparatus name obtaining unit 13 (Step A11).

Incidentally, if the designated program name taken out does not coincide with any host program name stored in the table 9 at Step A9, [i.e., if the designated program name taken out (a pseudo program name and a host program name) is not stored in the table 9], the connection request processing unit 7 transmits an error message to the terminal 3A, 3B, 3C or 3D which has transmitted the connection request command (from NO route at Step A9 to Step A12).

Further, an actual operation of the communication system according to this embodiment will be described with reference to FIG. 2.

Figure 4:
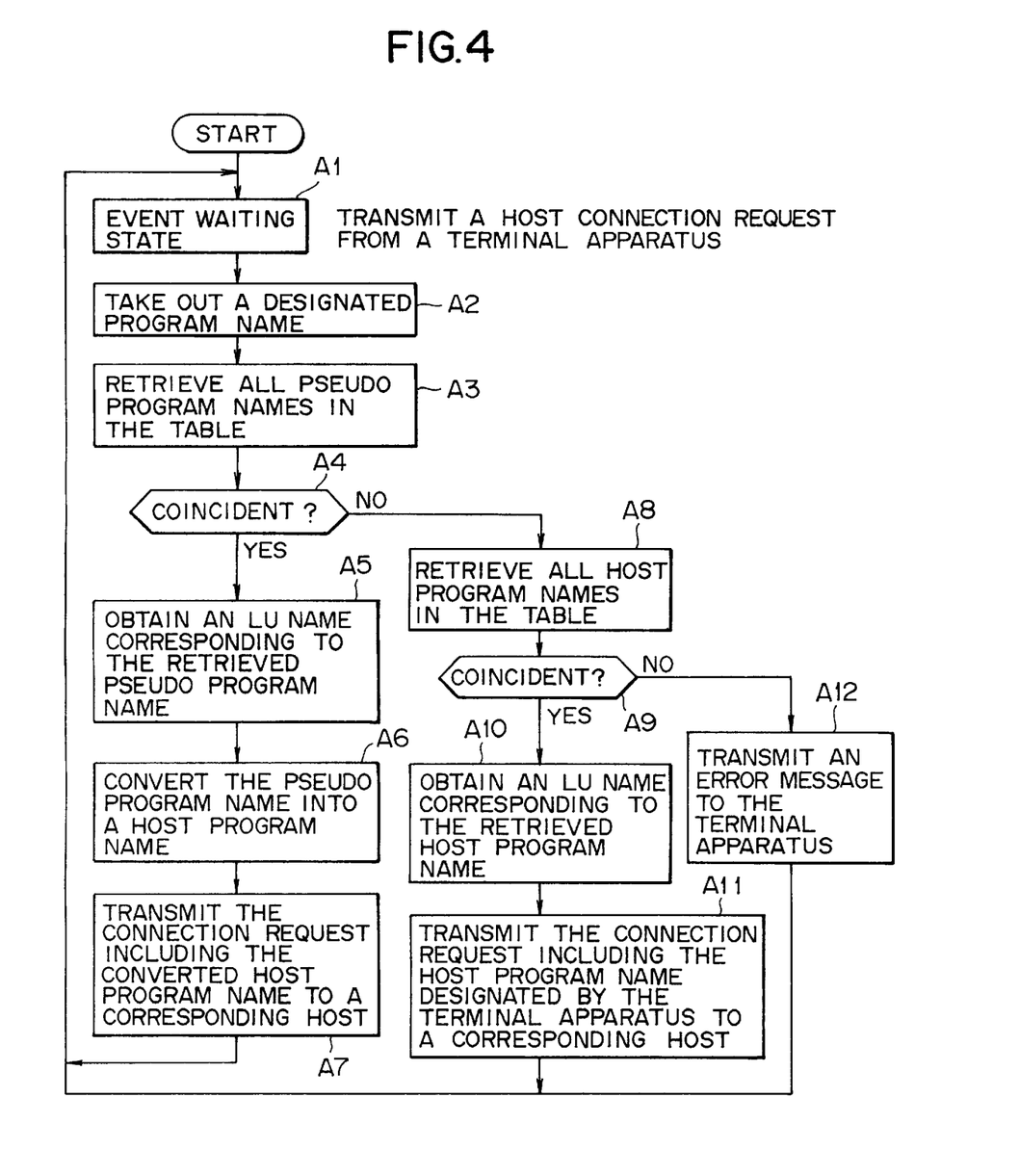
FIG. 4 is a flowchart for illustrating the operation of the communication system having the communication controlling apparatus according to the embodiment of this invention.

If an operator of the terminal 3A, 3B, 3C or 3D intends to use, for example, the program "TSS" stored in the host 1A, the operator transmits a connection request command LOGON 'TSSA' in which a pseudo program name "TSSA" is designated from that terminal 3A, 3B, 3C or 3D (refer to Step A1 in FIG. 4).

When the gateway 2 receives this connection request command, the connection request processing unit 7 of the gateway 2 takes out the pseudo program name "TSSA" from the connection request command (refer to Step A2), retrieves the pseudo program name "TSSA" (refer to Step A3), obtains an LU name "LUA" of the host 1A corresponding to the pseudo program name "TSSA" (refer to Step A5), converts the pseudo program name "TSSA" in the transmitted connection request command into a host program name "TSS" (refer to Step A6), then transmits the connection request command LOGON 'TSS' in which the converted host program name "TSS" is designated, to the corresponding host 1A (refer to Step A7).

If an operator of the terminal 3A, 3B, 3C or 3D intends to use, for example, a program "TSS" stored in the host 1B, the operator transmits from that terminal 3A, 3B, 3C or 3D a connection request command LOGON 'TSSB' in which a pseudo program name "TSSB" is designated (refer to Step A1).

When the gateway 2 receives this connection request command, the connection request processing unit 7 of the gateway 2 takes out the pseudo program name "TSSB" from the connection request command similarly to the case where the pseudo program name "TSSA" is designated (refer to Step A2), retrieves the pseudo program name "TSSB" (refer to Step A3), obtains an LU name "LUB" of the host 1B corresponding to the pseudo program name "TSSB" (refer to Step A5), converts the pseudo program name "TSSB" in the transmitted connection request command into a host program name "TSS" (refer to Step A6), then transmits the connection request command LOGON 'TSS' in which the converted host program name "TSS" is designated, to the host 1B corresponding to the LU name "LUB" (refer to Step A7).

An operation in the case where an operator of the terminal 3A, 3B, 3C or 3D uses a program "TSS" stored in the host 1C is similar to the case where the programs "TSS" stored in the hosts 1A and 1B are used.

If an operator of the terminal 3A, 3B, 3C or 3D intends to use a program "AAA" stored in the host 1D, the operator transmits a connection request command LOGON 'AAA' in which a host program name "AAA" is designated from that terminal 3A, 3B, 3C or 3D dissimilarly to the case where the programs "TSS" stored in the hosts 1A through 1C are used (refer to Step A1).

When the gateway 2 receives this connection request command, the connection request processing unit 7 of the gateway 2 takes out the host program name "AAA" from the connection request command (refer to Step A2), then retrieves a pseudo program name in the table 9 shown in FIG. 2. However, since no pseudo program name is designated in this connection request command in this case, no corresponding pseudo program name is obtained in the retrieval (refer to Steps A3 and A4).

For this, the connection request processing unit 7 next retrieves the host program name "AAA" (refer to Step A8).

When the host program name "AAA" is retrieved, the connection request processing unit 7 obtains an LU name "LUD" of the host 1D corresponding to the host program name "AAA" (refer to Step A10), then transmits the transmitted connection request command LOGON 'AAA' as it is to the host 1D corresponding to the LU name "LUD" (refer to Step A11).

In the communication system 20 having the communication controlling apparatus according to this embodiment, the gateway 2 as the communication controlling apparatus has the table 9 in which LU names which are information relating to host names, host program names and pseudo program names are stored in such a manner that they are corresponded to each other, and the control unit 10 which controls communications between the hosts 1A through 1D and the terminals 3A through 3D, as above. The control unit 10 receives a pseudo program name transmitted from each of the terminals 3A through 3D, obtains an LU name of a host 1A, 1B, 1C or 1D corresponding to the pseudo program name from the information stored in the table 9, converts the pseudo program name into a corresponding host program name on the basis of the information stored in the table 9, and transmits the converted host program name to the host 1A, 1B, 1C or 1D corresponding the obtained LU name. In consequence, it is possible that each of the terminals 3A through 3D can be certainly connected to each of the plural hosts 1A through 1D storing a desired program while the terminal is not conscious of a host name even if the plural hosts 1A through 1D (the hosts 1A through 1C in FIG. 1) store programs having the identical names so that a service provided to users may be improved.

The storage unit 8 holds the table 9 storing upper apparatus names, program names and pseudo program names in such a manner that they are corresponded to each other, thereby simplifying a process conducted in the control unit 10.

What is claimed is:

1. A communication controlling apparatus which is connected to a plurality of upper apparatuses each for storing the same program having the same name and a plurality of lower apparatuses each for performing a desired process using the same program for controlling communications between said upper and lower apparatuses, comprising:

(I) a storage unit for storing information relating to upper apparatus names, information relating to the same program names, and information relating to pseudo program names, which are synthesized of said information relating to the same program names and information relating to a specified one of said upper apparatuses, showing correspondence between the same programs and said specified one of said upper apparatuses in which the same programs are stored in such a manner that said information relating to upper apparatus names, said information relating to the same program names and said information relating to pseudo program names are correlated with each other, and (II) a control unit for controlling a communication between said specified upper apparatus and an individual lower apparatus, said control unit including (A) means for receiving information relating to said pseudo program name transmitted from an individual lower apparatus, (B) means for obtaining information relating to an objective upper apparatus name corresponding to the information relating to said pseudo program name from the information stored in said storage unit by using the received pseudo program name of said means for receiving information, (C) means for converting said received information relating to said pseudo program name into information relating to the same program name on the basis of the information stored in said storage unit by using the received pseudo program name of said means for receiving information, and (D) means for transmitting the information relating to the converted same program name to said objective upper apparatus of said means for obtaining information.

2. The communication controlling apparatus according to claim 1, wherein said storage unit has a table in which information relating to said upper apparatus names, information relating to said program names and information relating to said pseudo program names are stored in such a manner that said information relating to said upper apparatus names, said information relating to said program names and said information relating to said pseudo program names are corresponded to each other.

3. The communication controlling apparatus according to claim 1, wherein said control unit comprises:

a connection request receiving unit for receiving a connection request command including information relating to said pseudo program name transmitted from said lower apparatus;

a pseudo program name information retrieving unit for taking out the information relating to said pseudo program name from said connection request command received by said connection request receiving unit to retrieve from the information stored in said storage unit the information relating to said pseudo program name taken out from said connection request command;

an upper apparatus name information obtaining unit for obtaining information relating to said upper apparatus name corresponding to the information relating to said pseudo program name retrieved by said pseudo program name information retrieving unit from the information stored in said storage unit;

a program name information converting unit for converting said pseudo program name information included in said connection request command into information relating to said program name corresponding to the information relating to said pseudo program name retrieved by said pseudo program name information retrieving unit on the basis of the information stored in said storage unit; and a connection request transmitting unit for transmitting said connection request command including the information relating to said program name converted by said program name information converting unit to said upper apparatus corresponding to the information relating to said upper apparatus name obtained by said upper apparatus name information obtaining unit.

4. A communication controlling method for use in a communication controlling apparatus, for connecting to a plurality of upper apparatuses each for storing the same program having the same name and a plurality of lower apparatuses each for performing a desired process using the same program and a connection request processing unit comprising:

(a) providing a storage unit for storing information relating to upper apparatus names, information relating to the same program names and information relating to pseudo program names, which are synthesized of said information relating to the same program names and information relating to a specified one of said upper apparatuses, showing correspondence between the same programs and said specified one of said upper apparatuses in which the same programs are stored in such a manner that said information relating to upper apparatus names, said information relating to the same program names and said information relating to pseudo program names are correlated with each other;

(b) receiving information relating to said pseudo program name transmitted from an individual lower apparatus;

(c) obtaining information relating to an objective upper apparatus name corresponding to the information relating to said pseudo program name from the information stored in said storage unit by using the received pseudo program name of step (b);

(d) converting said received information relating to said pseudo program name into information relating to the same program name on the basis of the information stored in said storage unit by using the received pseudo program name of step (b); and (e) transmitting the information relating to the converted same program name to said objective upper apparatus of step (c).

5. A communication system, comprising:

a plurality of upper apparatuses each for storing the same program having the same name;

a plurality of lower apparatuses each for performing a desired process using the same program; and a communication controlling apparatus connected to said upper and lower apparatuses, for controlling communications between said upper and lower apparatuses;

said communication controlling apparatus including
- (I) a storage unit for storing information relating to upper apparatus names, information relating to the same program names and information relating to pseudo program names, which are synthesized of said information relating to the same program names and information relating to a specified one of said upper apparatuses, showing correspondence between the same programs and said specified one of said upper apparatuses in which the same programs are stored in such a manner that said information relating to upper apparatus names, said information relating to the same program names and said information relating to pseudo program names are correlated with each other, and
- (II) a control unit for receiving information relating to said pseudo program name transmitted from an individual lower apparatus, obtaining information relating to an objective upper apparatus name corresponding to the information relating to said pseudo program name from the information stored in said storage unit by using the received pseudo program name, converting said received information relating to said pseudo program name into information relating to the same program name on the basis of the information stored in said storage unit by using the received pseudo program name, and transmitting the information relating to the converted same program name to said objective upper apparatus, thereby controlling communications between said specified upper apparatus and said individual lower apparatus.

6. The communication system having said communication controlling apparatus according to claim 5, wherein said upper apparatus is a host computer.

7. The communication system having said communication controlling apparatus according to claim 5, wherein said lower apparatus is a terminal apparatus.

8. The communication system having said communication controlling apparatus according to claim 5, wherein said communication controlling apparatus is a gateway.

* * * * *

UNITED STATES PATENT AND TRADEMARK OFFICE
CERTIFICATE OF CORRECTION

PATENT NO.:     6,088,738
DATED      :    July 11, 2000
INVENTOR(S):    Hideaki OKADA It is certified that errors appears in the above-identified patent and that said Letters Patent is hereby corrected as shown below:

Title page item
[56] References Cited,
    "5,548,729 8/1996" should read --6/1992--;
    "5,568,180 10/1996" should read --4/95--;
    "5,583,862 12/1996" should read --3/1995--;
    "5,655,073 8/1997" should read --6/1995--;
    "5,748,894 5/1998" should read --4/1994--;
    "5,805,816 9/1998" should read --11/1996--; and
    "5,815,664 9/1998" should read --8/1996--.

Column 14,
    line 29, after "unit" insert --,--.

Signed and Sealed this

Seventeenth Day of April, 2001

*Attest:*

NICHOLAS P. GODICI

*Attesting Officer*      Acting Director of the United States Patent and Trademark Office